(12) United States Patent
Yamada et al.

(10) Patent No.: US 10,025,545 B2
(45) Date of Patent: Jul. 17, 2018

(54) PRINTING SERVER CONFIGURED TO COMMUNICATE WITH SOCIAL NETWORKING SERVICE, PRINTING SYSTEM, AND PRINTING METHOD

(71) Applicant: SEIKO EPSON CORPORATION, Tokyo (JP)

(72) Inventors: Norihiko Yamada, Nagano (JP); Toshiaki Okayama, Ikeda-machi (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 14/478,821

(22) Filed: Sep. 5, 2014

(65) Prior Publication Data

US 2015/0116761 A1 Apr. 30, 2015

(30) Foreign Application Priority Data

Oct. 24, 2013 (JP) ................................. 2013-221555

(51) Int. Cl.
*G06F 3/12* (2006.01)
(52) U.S. Cl.
CPC .......... *G06F 3/1265* (2013.01); *G06F 3/1204* (2013.01); *G06F 3/1242* (2013.01); *G06F 3/1268* (2013.01); *G06F 3/1287* (2013.01); *G06F 3/1288* (2013.01); *G06F 3/1222* (2013.01); *G06F 3/1238* (2013.01); *G06F 3/1292* (2013.01)
(58) Field of Classification Search
CPC .... G06F 3/1204; G06F 3/1207; G06F 3/1244; G06F 3/1259; G06F 3/126; G06F 3/1265; G06F 3/1268; G06F 3/1287; G06F 3/1293; G03F 3/1268

USPC ............. 358/1.15, 1.13; 709/203, 217, 206; 713/152

See application file for complete search history.

(56) References Cited

U.S. PATENT DOCUMENTS

| 7,886,000 B1* | 2/2011 | Polis et al. ................... 709/203 |
| 9,081,533 B1* | 7/2015 | West ..................... G06F 3/1204 |
| 9,560,157 B1* | 1/2017 | Zuccarino ............... H04L 67/02 |
| 9,648,380 B2* | 5/2017 | Gharaat .............. G06F 17/3002 |
| 2009/0310164 A1* | 12/2009 | Takahashi ............. G06F 3/1285 358/1.15 |

(Continued)

FOREIGN PATENT DOCUMENTS

| JP | 2008-197968 A | 8/2008 |
| JP | 2013-166346 A | 8/2013 |

*Primary Examiner* — Benny Q Tieu
*Assistant Examiner* — Juan M Guillermety

(57) ABSTRACT

A printing system holds a plurality of content data and linking information which links a printer and registration information of a user registered to an SNS. When a posting including content data identification information is performed to the SNS, the printing system judges the presence or absence of linking of the registration information of the user who has posted and the printer by referring to the linking information. When there is a printer linked to the registration information of the user who has posted, the printing system acquires content data identified by the identification information included in the posting from the content data holding unit, generates print data for printing an image from the content data, sends the print data to the printer linked to the registration information of the user who has performed the posting, and causes the printer to print the image based on the print data.

1 Claim, 7 Drawing Sheets

(56) References Cited

U.S. PATENT DOCUMENTS

| | | | |
|---|---|---|---|
| 2010/0302579 A1* | 12/2010 | Nuggehalli et al. | 358/1.15 |
| 2011/0090529 A1* | 4/2011 | Hertling | 358/1.15 |
| 2011/0211218 A1* | 9/2011 | Gilmore et al. | 358/1.15 |
| 2012/0150973 A1* | 6/2012 | Barak | H04L 63/102 709/206 |
| 2012/0154854 A1* | 6/2012 | Sato | G06F 3/1265 358/1.15 |
| 2012/0250074 A1* | 10/2012 | Kamppari | G06F 3/1204 358/1.15 |
| 2012/0250997 A1* | 10/2012 | Kumazaki | H04N 1/00167 382/167 |
| 2013/0215460 A1 | 8/2013 | Eguchi | |
| 2014/0095536 A1* | 4/2014 | Raichelgauz | G06F 17/30023 707/769 |
| 2014/0376039 A1* | 12/2014 | Shiratori | 358/1.15 |

* cited by examiner

PRINTING SERVER CONFIGURED TO COMMUNICATE WITH SOCIAL NETWORKING SERVICE, PRINTING SYSTEM, AND PRINTING METHOD

CROSS-REFERENCE TO RELATED APPLICATIONS

This application claims priority to Japanese Patent Application No. 2013-221555 filed on Oct. 24, 2013. The entire disclosure of Japanese Patent Application No. 2013-221555 is hereby incorporated herein by reference.

BACKGROUND

Technical Field

The present invention relates to a printing server, a printing system, and a printing method.

Related Art

Provided is a service that makes it possible for a user to operate an information terminal (mainly a personal computer (PC)) and select contents (images) published on a specific site on the internet, to download that to an information terminal, and to print it using a printer connected to the information terminal.

Also, as related technology, known is an event image publishing system that browses images published on a photo album site by a server device from an image browsing terminal, and when the server device receives an image print order from the image browsing terminal, it sends the print order to an online print site (see Unexamined Patent Publication No. 2008-197968).

As with the service described above, the action of the user operating the information terminal to access a specific site on the internet and select desired content within the site requires many operations by the user, so cannot be called an easy action. Also, there are cases when for the purpose of content protection, in the specific site described above, it is necessary to have a dedicated application software or plug-in for browsing or downloading contents. In such a case, the user is forced to take the trouble to install the dedicated application software or plug-in, and this is a factor in it being difficult to expand usage by users. Also, when the user does not have an environment on which the dedicated application software or plug-in will operate (OS, web browser or the like), the user is not able to use the service described above in any case.

With Unexamined Patent Publication No. 2008-197968, images uploaded to the photo album site can be downloaded to the user's own image browsing terminal, so there is a problem from the perspective of content protection. Also, with Unexamined Patent Publication No. 2008-197968, since the constitution has printing ordered to an online print site, it is not possible to specify the printer to use as is the case with printing on the printer the user has, so this cannot be said to be convenient for the user.

Also, as a problem common to the service described above and Unexamined Patent Publication No. 2008-197968, use of the service and system tends to stay within the range of users who are aware of the existence of the specific site or photo album site, and there is an aspect of it being difficult to try to expand the number of users from the service or system providing side as well.

SUMMARY

The present invention was created to address at least a part of the problems described above, and an object is to provide a printing server and printing system that is highly convenient and is excellent in terms of content protection, made so that the desired content printing results can be obtained more easily using an environment used by many users in everyday life.

With one mode of the invention, a printing server is equipped with a linking information holding unit configured to hold linking information which links a user registration information relating a user registered in a social networking service (hereafter referred to as SNS) and a printer, an identification information acquisition unit configured to acquire identification information from the SNS to which a posting including identification information for identifying content data that expresses an image has been performed, a content data acquisition unit configured to acquire content data specified by the acquired identification information, and a printing instruction unit configured to cause the printer to print the acquired content data, the printer being linked to the registration information of a user that has performed the posting.

With this constitution, a user registered to the SNS, for whom the printer the uses is linked with the user's own registration information in the linking information, simply by posting the identification information corresponding to content data in the SNS, has the linked printer automatically print an image of that content data. In other words, the user is able to obtain printing results of an image uniquely shown by the identification information simply by operating the information terminal and posting the identification information in the normally used SNS. Also, the content data is not downloaded to the information terminal used by the user, but rather is printed by the printer for which information is noted in the linking information, so the content protection effect is also high.

With one mode of the invention, it is also possible that the content data acquisition unit is configured to acquire the content data specified by the identification information included in the posting, which is, as a subject, only a posting that specifies for a destination an account with the social networking service of the printing server, and that includes the identification information.

With this constitution, it is possible to significantly focus the opportunities to acquire content data.

With one mode of the invention, it is also possible, when the identification information as well as specific information indicating a printing condition are included in the posting, for the printing instruction unit to cause printing according to the printing condition indicated by the specific information.

As the specific information indicating the printing conditions, for example, there are specific text strings indicating the number of copies to print, the paper size, selection of color or monochromatic, or the like. With this constitution, printing can be performed according to specific information indicating the printing conditions posted by the user together with the identification information.

With one mode of the invention, the printing server can also be equipped with a print data generating unit configured to generate print data by synthesizing an image indicated by the acquired content data and a character or an image included in the posting, and the printing instruction unit is further configured to send the generated print data to the printer linked to the registration information of the user who has performed the posting and cause the printer to print the image based on the print data. It is also possible for the print data generating unit to generate print data by synthesizing an image indicated by the acquired content data and at least a portion of information of meta data accompanying the posting.

With this kind of constitution, it is possible to obtain printing results not only for printing of an image shown by the content data as is, but also as a synthesis of a photo or message posted by the user on the SNS, or the user name, profile photo, posting date and time or the like (example of meta data contents) and the image shown by the content data.

With one mode of the invention, the printing server can also be equipped with a notification processing unit configured to notify the user who has performed the posting of a state of progress of processing relating to the printing using a designated communication function.

With this constitution, the user who did the posting is able to know the progress status with notification from the printing server. As the designated communication function, a function of posting to the SNS, a function of sending e-mail or the like is indicated.

With one mode of the invention, the printing server can also be equipped with a sample image posting unit configured to specify as a destination an account on the social networking service of the user who has performed the posting, and post a sample image of the content data identified by the identification information included in the posting.

With this constitution, the user, by viewing a posting to himself from the printing server side, is able to confirm the contents of the content data to be printed by posting the identification information using the shape of the sample image. Also, this is nothing more than a sample image, so content protection is maintained.

The technical concept of the invention is not limited to being only the printing server like that described above, but can also be realized using various categories including other items, method, or computer programs, or also a computer readable recording medium on which that program is recorded. It is also possible to consider a printing system including the printing server for one part as one invention. In this case, the printing system is equipped with a content data holding unit configured to hold content data that expresses an image, a linking information holding unit configured to hold linking information for which user registration information registered in a social networking service and a printer are linked, an identification information acquisition unit configured to acquire identification information from the social networking service for which a posting including identification information for identifying the content data has been performed, a content data acquisition unit configured to acquire content data specified by the acquired identification information from the content data holding unit, and a printing instruction unit configured to cause the printer to print the acquired content data, the printer being linked to the registration information of the user who has performed the posting.

Also, the printing system can also provide a web page for publishing a plurality of combinations of the content data and the identification information for identifying the content data.

BRIEF DESCRIPTION OF THE DRAWINGS

Referring now to the attached drawings which form a part of this original disclosure:

FIG. 5A is a drawing showing an example of an authentication page or the like;

FIG. 5B is a drawing showing the example of the authentication page or the like;

DETAILED DESCRIPTION OF EXEMPLARY EMBODIMENTS

Figure 1:
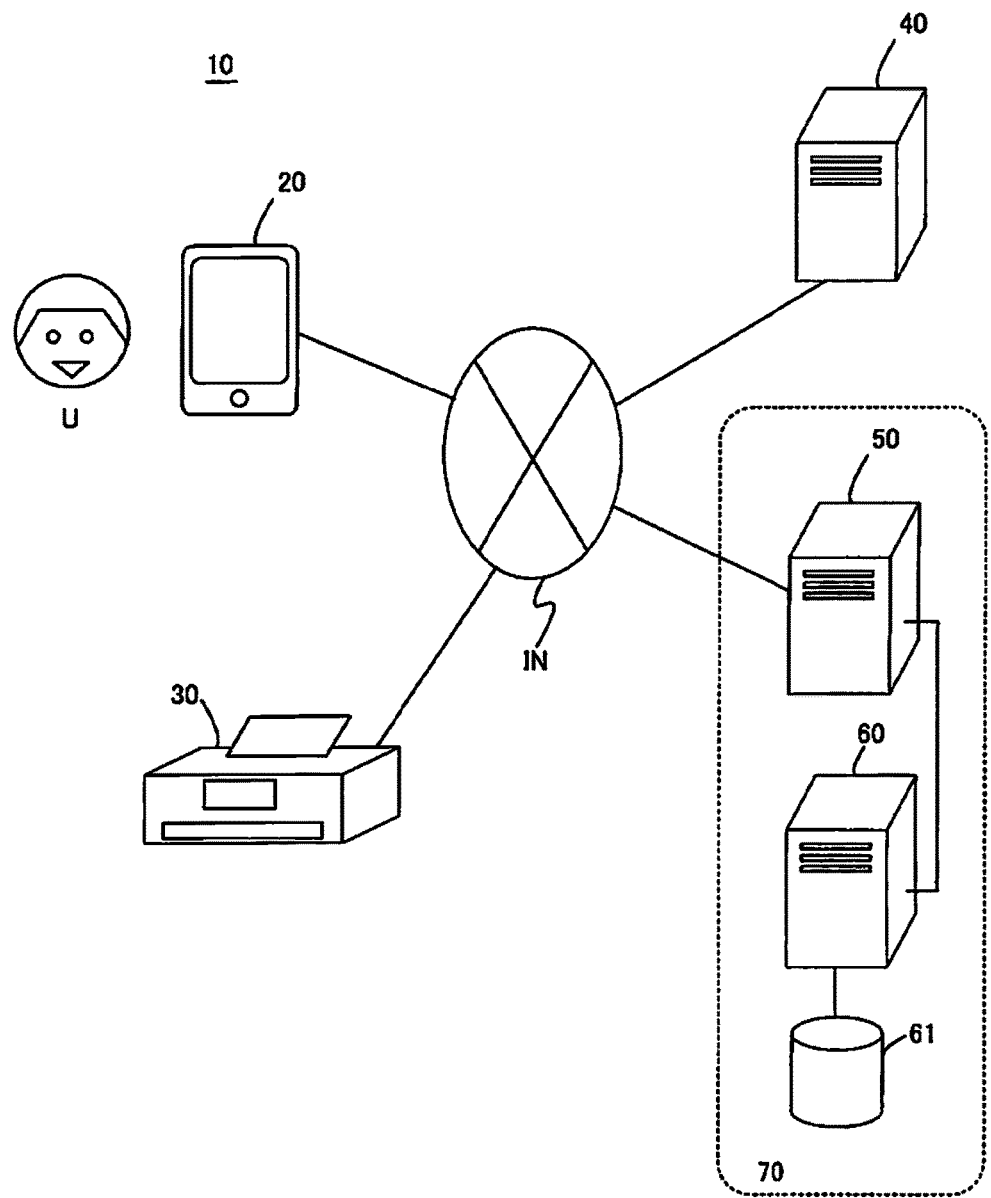
FIG. 1 is a drawing showing in a simple manner the system of this embodiment.

The embodiments of the present invention will be described according to the following sequence.
1. System Overview
2. User Information Linking
3. Flow from Posting to Printing
4. Modification Examples 1. System Overview FIG. 1 shows in a simple manner a system 10 of this embodiment. The system 10 includes an information terminal 20, a printer 30, an SNS server 40, and a printing system 70. The system 10 includes a portion of the printing system 70, but the entire system 10 can also be called the printing system. The information terminal 20 is a communication device held by a user U, with applicable examples including a smart phone, a tablet terminal, a desktop or laptop PC or the like. Also, the user U is the owner of the printer 30. The printer 30 can be any model, and for example can be a so-called inkjet printer, a so-called laser printer or the like.

Both the information terminal 20 and the printer 30 have a communication function with the outside, and are connected to an internet IN either with wires or wirelessly. The SNS server 40 is a server for providing the SNS to many users via the internet IN. As the SNS provided by the SNS server 40, examples include the services of Twitter (registered trademark), Facebook (registered trademark) and the like, but is not limited to these. Also, in FIG. 1, the SNS server (code number 40) is noted as only one unit, but of course it is also possible to have a plurality of SNS servers for which respectively independent SNS are provided on the internet. The user U is a user registered with a specific SNS provided by the SNS server 40 and has "SNS registration information." SNS registration information is for example a user name, password or the like acknowledged by the SNS server 40 to specify the user U with the SNS. The user U normally operates the information terminal 20 and uses the SNS by the web browser and application software functions built into the information terminal 20.

Furthermore, the user U specifies any printer 30 used at home or an office so it is registered in advance in the printing system 70. Said another way, the printing system 70 has the printer 30 linked to the user U registered as one print data sending destination. The printing system 70 provides designated services to many users (e.g. the user U) via the internet IN. With this embodiment, the services that the printing system 70 can provide to the user are generically referred to as "print services."

The user U is able to have e-mail contents or an image attached to e-mail printed by the printer 30 by sending e-mail from the information terminal 20 to an e-mail address allocated to the printer 30 by the printing system 70, for example (see Unexamined Patent Publication No. 2012-159914). This kind of printing using e-mail is a part of the print services.

The printing system 70 corresponds to the printing system mentioned in the patent claims, and has one or more servers (e.g. servers 50 and 60). It is also possible to call the server 50 a print control server 50, and to call the server 60 a content management server 60 or the like. The servers 50 and 60 are connected to be able to mutually communicate with a local network, for example. Also, for example, the server 60 has a database 61 using a hard disk drive (HDD) or the like that stores a plurality of content data that expresses an image.

Figure 2:
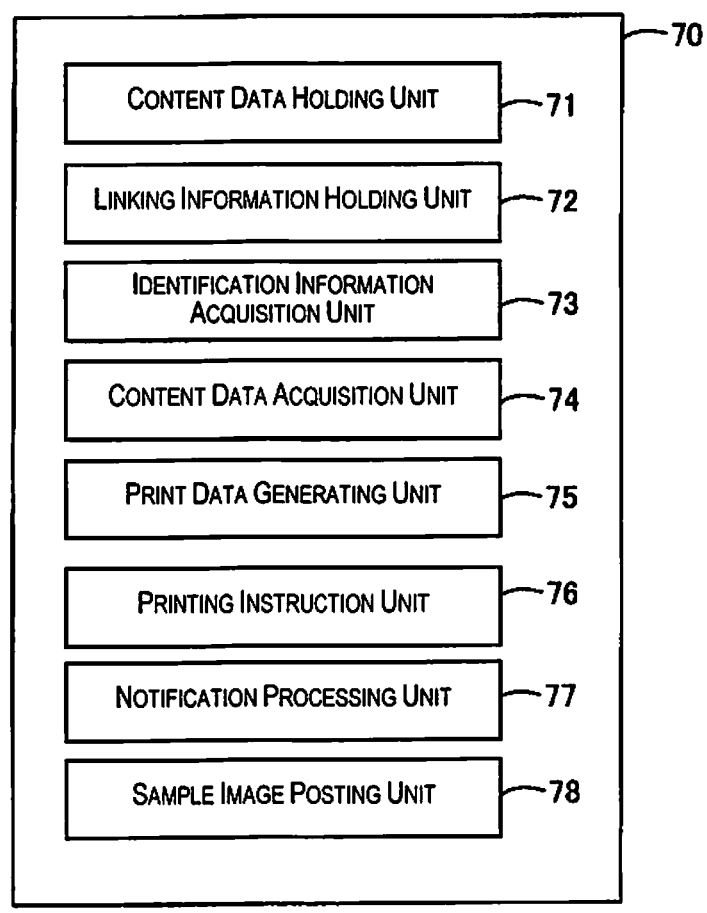
FIG. 2 is a block diagram showing the functions realized by the printing system.

FIG. 2 is a block diagram showing the functions realized by the printing system 70. The printing system 70 realizes the various functions of a content data holding unit 71, a linking information holding unit 72, an identification information acquisition unit 73, a content data acquisition unit 74, a print data generating unit 75, a printing instruction unit 76, a notification processing unit 77, a sample image posting unit 78 and the like. Each of these functions is realized by arithmetic processing according to a designated program built into the servers 50 and 60 being performed in collaboration with hardware such as a CPU, ROM, RAM, or HDD that the servers 50 and 60 have. Also, the server 60 that has the database 61 and controls it can be called the content data holding unit 71. With the printing system 70, the servers 50 and 60 do not have to have the respective roles and functions strictly divided. For example, at least a portion of the functions described with this specification as items realized by the server 50 can be realized by the server 60, and at least a portion of the functions described with this specification as items realized by the server 60 can be realized by the server 50. Therefore, the server 50 or the servers 50 and 60 correspond to the printer server mentioned in the patent claims. Also, the functions that the server 50 has can be constituted to be realized by a plurality of servers other than the server 60. In this case, the plurality of servers correlate to the printing server.

2. User Information Linking

Next, the user information linking process will be described. In summary form, this linking process is the process of the printing system 70 linking the printer 30 that the user U has with the SNS registration information of the user U, and of holding the linking results (linking information).

Figure 3:
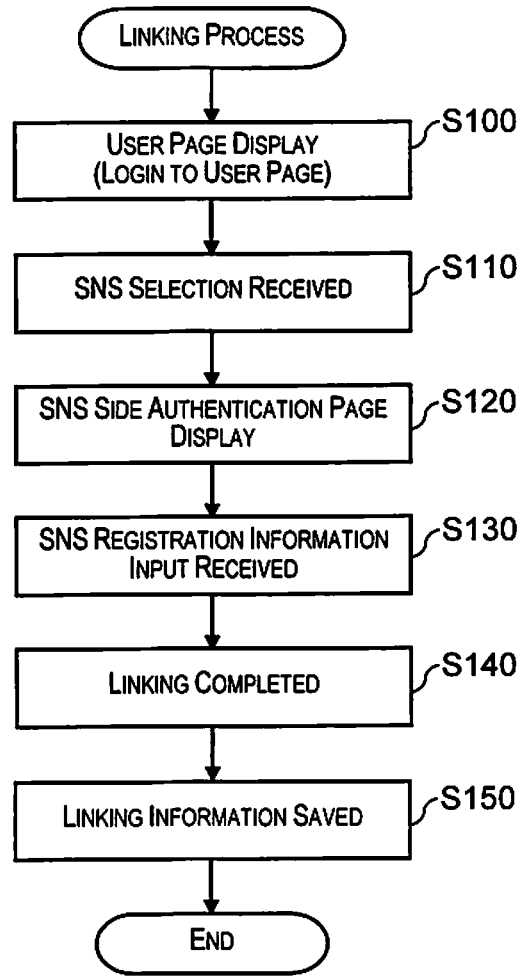
FIG. 3 is a flow chart showing the linking process.

FIG. 3 is a flow chart showing this linking process.

At step S100, a user page provided by the server 50 is displayed on a screen of the information terminal 20 operated by the user U. The user U operating the information terminal 20, for example, displays a screen for login to the print service on the screen of the information terminal 20 using the web browser or application software functions, and inputs the user's own (user of the printer 30 already registered to the printing system 70) pre-allocated login password or the like on that login screen. By doing this, a user page dedicated to the print service user U (user of the printer 30 already registered to the printing system 70) is displayed on the screen of the information terminal 20 (login for the user page). Before the flow chart of FIG. 3 is disclosed, as described above, the user U has the printer 30 registered to the printing system 70.

A simple description of the process of registering the printer 30 to the printing system 70 (see Unexamined Patent Publication No. 2012-159914 as appropriate) will be given. With the instruction to start a registration request sent from the information terminal (e.g. the information terminal 20) operated by the user U to the printer 30 as a trigger, the printer 30 sends the registration request to the printing system 70 together with the printer 30 specific information (model specific ID or serial number) to the server 50 using HTTP (Hypertext Transfer Protocol). The server 50 that receives the registration request allocates an internal ID, a login password for XMPP (eXtensible Messaging and Presence Protocol) connection, a user page URL, a user page login password, an e-mail address or the like in response to the printer 30 specific information so as not to be redundant with other already registered printer registration information. The server 50 correlates the internal ID allocated in this way with the login password for XMPP connection, the user page URL, the login password to the user page, the e-mail address or the like, and registers this to the database inside the printing system 70. Information registered in this way will hereafter be generally referred to as "printer registration information."

Furthermore, the server 50 sends the registration information of the printer and the XMPP domain name of the server 50 to the printer 30 which is the sending source of the registration request using HTTP. The printer 30 stores the sent printer registration information and the server 50 XMPP domain name in a designated memory, and generates an ID (ID for XMPP connection) that combines the internal ID of that registration information and the XMPP domain name. Then, the printer 30 sends to the server 50 as XMPP connection information the ID for XMPP connection and the login password for XMPP connection within that registration information. The server 50 that receives the XMPP connection information establishes an XMPP connection with the send source printer 30. Also, with this kind of registration processing process, at least a portion of the printer registration information (user page URL, user page login password, e-mail address or the like) is notified and displayed on the screen to the information terminal 20 operated by the user U via the printer 30.

Return to the description of FIG. 3, at step S110, the server 50 receives the SNS selection via the user page.

Figure 4A:
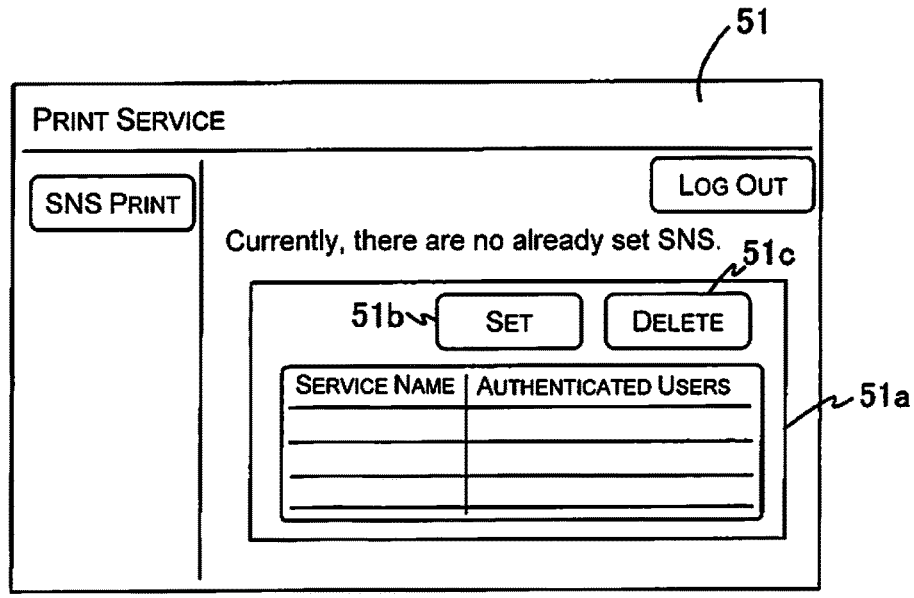
FIG. 4A is a drawing showing an example of a user page.

FIG. 4 shows an example of a portion of the user page displayed on the screen of the information terminal 20 in the process of step S110. The user page 51 shown in FIG. 4A includes the SNS linked to the current printer 30 and an SNS setting status field 51*a* which shows a list of users of that SNS. By the user U selecting a designated menu (e.g. the menu "SNS print," see FIG. 4) within the user's own user page after logging in to the print service at step S100, it is possible to have the user page 51 displayed on the screen of the information terminal 20.

An SNS setting button 51*b* and an SNS setting deletion button 51*c* are included in the SNS setting status field 51*a*. The user can add an SNS linked with the printer 30 by operating the SNS setting button 51*b*, and can delete an SNS link linked with the current printer 30 by operating the SNS setting deletion button 51*c*.

Figure 4B:
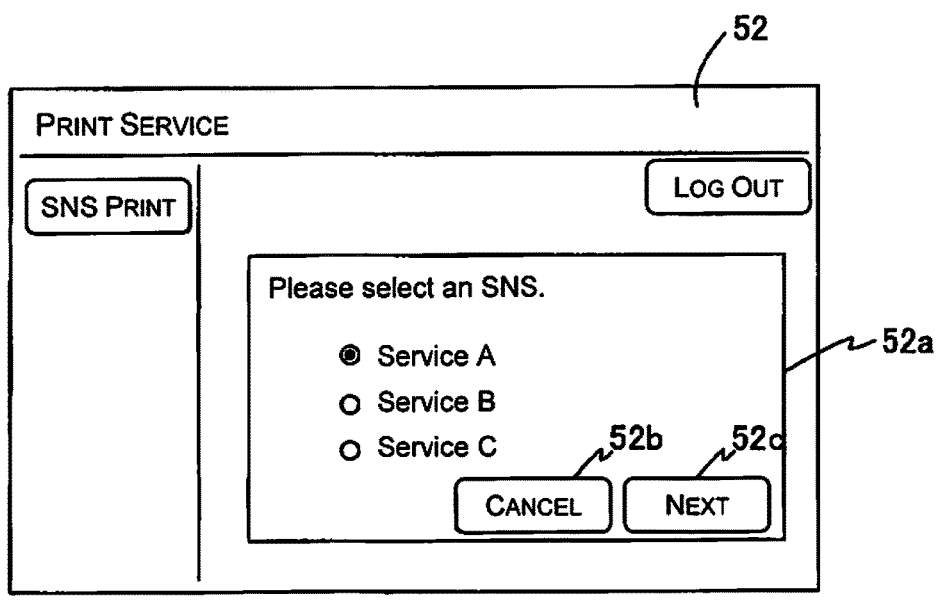
FIG. 4B is a drawing showing the example of the user page.

FIG. 4B shows the user page 52 displayed on the screen of the information terminal 20 when the SNS setting button 51*b* (FIG. 4A) is operated. The user page 52 includes an SNS selection field 52*a*. In the SNS selection field 52*a* is displayed a list of a plurality of SNS (e.g. service A, B, C, . . . ) that can be linked with a printer already registered by the printing system 70. Also, a cancel button 52*b* and a next button 52c are included in the SNS selection field 52a. By the user operating the next button 52c while selecting any SNS from among the plurality of SNS displayed in the SNS selection field 52a, it is possible to determine the selection of an SNS subject to linking with the printer 30. When operation of the next button 52c is recognized, the server 50 receives selection of the SNS selected within the current SNS selection field 52a.

At step S120, an authentication page provided by the SNS selected at step S110 (the SNS server that realizes that SNS) is displayed on the screen of the information terminal 20.

Figure 5A:
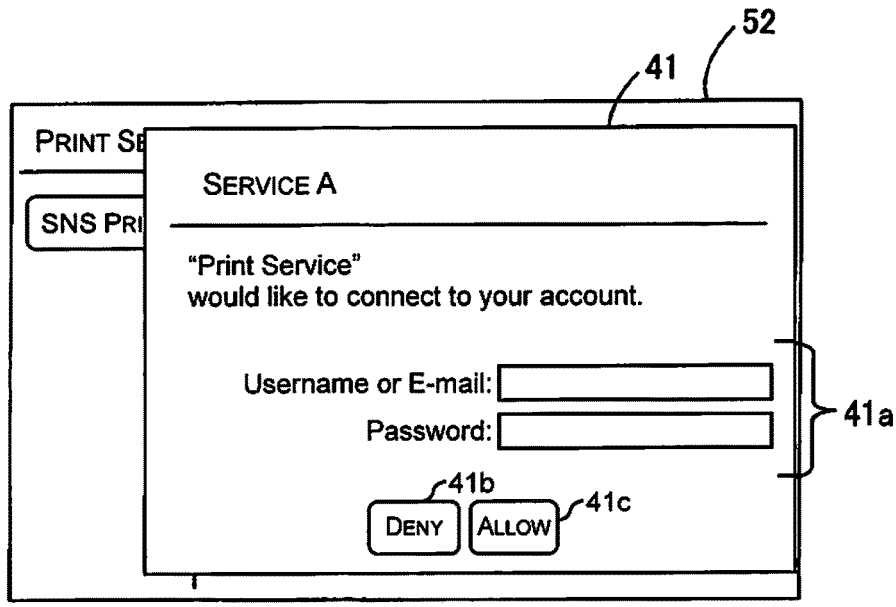

FIG. 5A shows an example of an authentication page 41 displayed on the screen of the information terminal 20 at step S120. For example, when the server 50 of the printing system 70 receives the SNS selection at step S110, using an API (Application Programming Interface) used by the server that provides that selected SNS (e.g. the SNS server 40), the authentication page 41 like that described above is displayed overlapping the user page 52. The authentication page 41 includes a registration information input field 41a, a denial button 41b, and an authentication button 41c.

With this embodiment, the user U already has registration information (user name password) of the SNS selected at step S110, and this registration information is input to the registration information input field 41a (step S130). Then, when authenticating that the SNS registration information is linked with the printer 30, the user U operates the authentication button 41c, and when denying that link, operates the denial button 41b. This kind of input operation to the authentication page 41 is notified to the server 50 of the printing system 70 from the SNS server 40. When it is recognized that there was operation of the authentication button 41c, the server 50 links the SNS registration information input in the registration information input field 41a of the authentication page 41 and the registration information of the user U's printer during login from after step S100 (step S140).

Figure 5B:
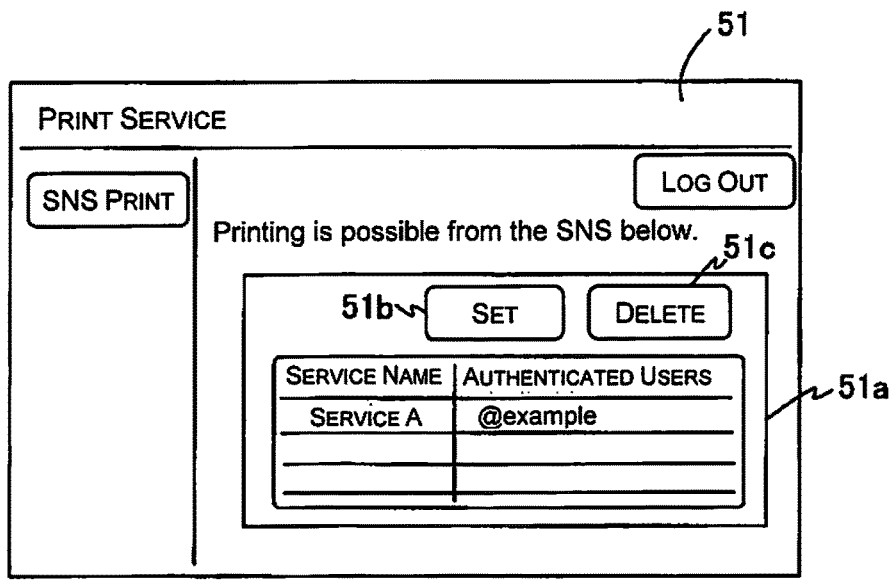

The SNS registration information is input in the registration information input field 41a of the authentication page 41, and when the authentication button 41c is operated, the screen display of the information terminal 20 returns to the user page 51. In this case, as shown by example in FIG. 5B, the SNS setting status field 51a of the user page 51 is in a state for which the name of the SNS (server name) for which linking is completed and the SNS user name (account) for which linking is authenticated are written and added. Once the linking of step S140 is performed, the server 50 saves those linking results (linking information) to the database inside the printing system 70 (step S150). Step S140 and step S150 are processes by the functions of the linking information holding unit 72. The above is the description of the linking process.

3. Flow from Posting to Printing

Figure 6:
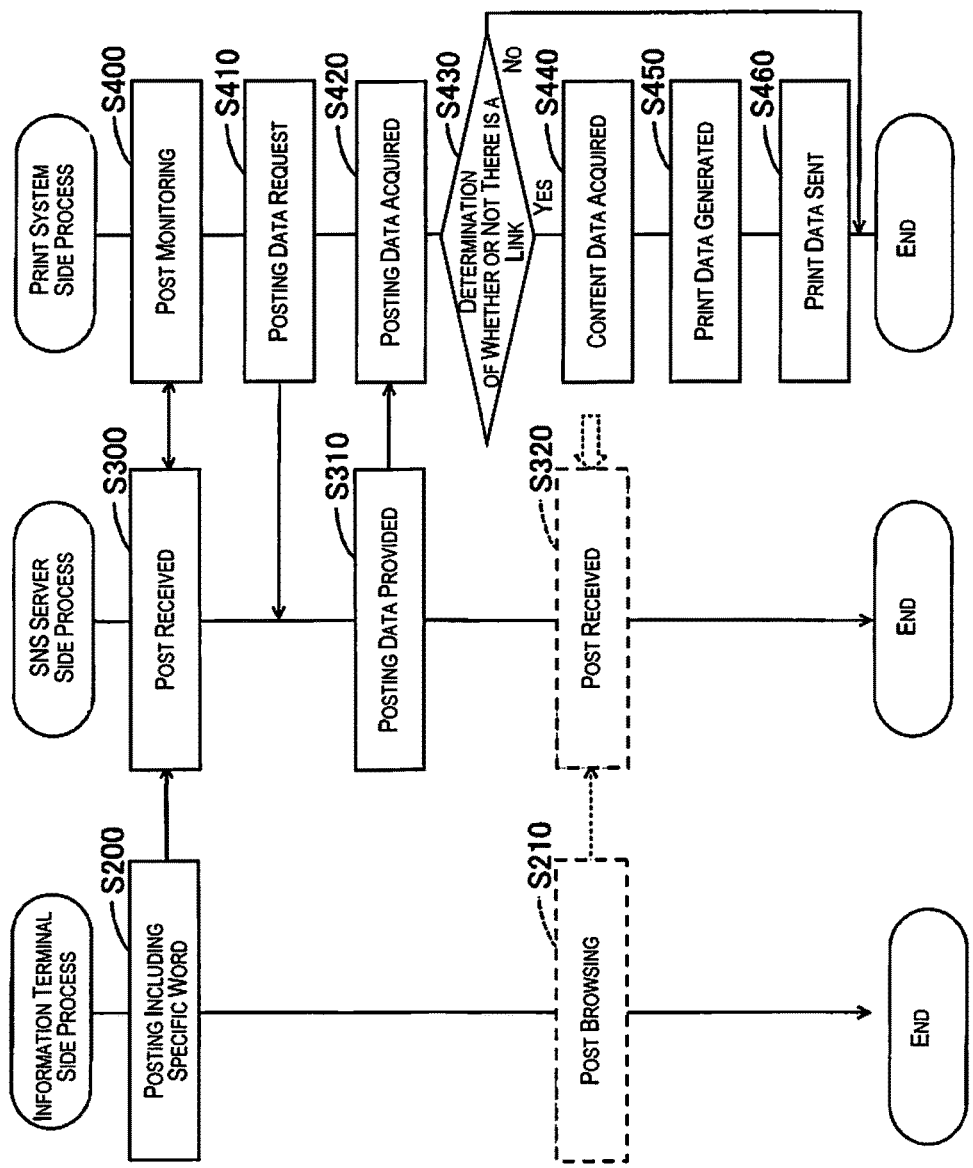
FIG. 6 is a flow chart showing the process from posting to the SNS until printing of the content data.

FIG. 6 is a flow chart showing the process from posting by the user U to the SNS up to when printing of the content data is performed. In FIG. 6, information terminal side processing means processing by the information terminal 20 operated by the user U, SNS server side processing means processing by the SNS server 40, and printing system side processing means processing by the printing system 70 (servers 50 and 60).

By the user U operating the information terminal 20 at any timing, posting is done including a specific word to the SNS provided by the SNS server 40 (step S200). A specific word is identification information for identifying (specifying) a plurality of content data held in the database 61. With the database 61, content data and a specific word that can uniquely identify that are linked and held. The user U already recognizes by some means the specific word linked to the content data he wishes to print, and does a posting including that recognized specific word in the text. For example, the user posts to the SNS text such as "@printservice I want to print this! #soccerplayerxyz" (muttering). With this embodiment, the specific word is "# (hash tag symbol)" constituted by the character string following after the hash tag symbol. Thus, the specific word included in the posting is #soccerplayerxyz. By using this kind of constitution for the specific word, the post monitoring described later is easy.

The SNS server 40 receives as necessary postings from the user of the SNS (user U) (step S300). Of course, postings by the user U can be seen through the respective information terminals of other users (followers or the like) set in advance so as to browse postings of the user U.

The server 50 uses the API provided by the SNS server 40 to monitor the existence of postings including the specific word (step S400). For example, the server 50 performs an inquiry to the SNS server 40 periodically (polling), and with postings done on the SNS server 40 after the previous inquiry as the monitoring subject, whether or not there is a posting including the specific word is detected. Alternatively, it is also possible for the server 50 to give a notification of all the specific words to the SNS server 40 in advance, to detect postings including the specific word in the SNS server 40, and to monitor notifications from the SNS server 40 to the effect that such postings were detected.

As a result of the monitoring, when a posting is detected that includes a specific word linked to any of the content data, the server 50 sends to the SNS server 40 a request for data (posting data) relating to the posting including that specific word (step S410). Posting data includes the posted character string itself or meta data that accompanies a posting. Meta data includes various types of information relating to the posting. The SNS server 40 that receives the posting data request from the server 50 provides that posting data by sending to the server 50 the request source of the posting data corresponding to that request (step S310).

Once it has acquired the posting data sent from the SNS sensor 40 (step S420), the server 50 determines the presence or absence of linking of the SNS registration information of the user U who performed the posting (posting detected by the monitoring of step S400) with the printer by referencing the linking information (step S430). In other words, the server 50 extracts at least a portion (e.g. the user name) of the SNS registration information of the posting source user U from the meta data that is a portion of the posting data acquired at the step S420, and determines whether or not the registration information of the printer linked to that extracted SNS registration information exists within the linking information. Then, when the registration information of the printer linked to that extracted SNS registration information does exist within the linking information, the process advances to step S440, and when it does not exist, that flow chart ends. However, the flow chart shown in FIG. 6 is executed repeatedly. The acquiring of posting data at step S420 includes acquiring the specific word from the SNS (SNS sever 40) for which the posting including the specific word was done. Steps S400, S410, S420, and S430 are processes done by the identification information acquisition unit 73.

At step S440, the server 50 acquires from the content data holding unit 71 the content data uniquely identified by the specific word included in the posting detected by the monitoring of step S400 (e.g. a photo of a soccer athlete linked to #soccerplayerxyz). In specific terms, the server 50 makes a request to the server 60 for content data linked to that specific word. The server 60 that receives that request extracts the content data linked to that specific word and sends it to the server 50. Step S440 is a process done by the content data acquisition unit 74.

Next, at step S450, the server 50 generates print data for printing an image from the content data acquired at step S440. The content data is not data of a format for which printing can be executed received as is by the printer registered in the printing system. Because of that, the server 50 converts the content data to data of a format for which the printer is able to execute printing. In this case, the server 50 converts the content data to image data described in so-called PDL (page description language) that can be interpreted by the printer 30 that is the sending destination of the print data. Alternatively, the server 50 generates as print data the data for which Form/Don't form ink drops (dot on/dot off) or the like is stipulated for each color of ink (ink used by the printer 30) for each pixel constituting an image. The printer 30 that is the print data sending destination of course is the printer 30 uniquely indicated by the registration information of the printer linked to the SNS registration information extracted from the posting data acquired at step S420. Step S450 is a process done by the print data generating unit 75.

Next, at step S460, the server 50 executes printing of an image based on the print data of the printer 30 by sending the print data generated at step S450 to the printer 30 that is the sending destination. In this case, the server 50 uses XMPP to notify the printer 30 that there is print data to be printed. The printer 30 that receives this notification uses HTTPS (Hypertext Transfer Protocol Secure) to send the print data request to the server 50. With HTTPS, the notification between the printer 30 and the server 50 is encrypted using TLS or SSL. The server 50 that receives this request uses HTTPS to send the print data generated at step S450 to the printer 30. As a result, printing of the image is executed based on the print data by the printer 30 held by the user U. Step S460 is a process done by the printing instruction unit 76.

In this way, with this embodiment, the printing system 70, while holding a plurality of content data for expressing an image, also holds linking information by which the printer 30 (registration information of the printer) is linked to the SNS registration information of the user U registered to the SNS provided by the SNS server 40. Then, when posting including the specific word for identifying the content data is done by the user U (information terminal 20) to the SNS, the linking information is referenced to determine the presence or absence of linking between the SNS registration information of that posting and the printer. Then, if it is determined that there is a link, the content data identified by the specific word included in that posting is acquired, print data is generated from that content data, and that is sent to the printer 30 linked to the SNS registration information of the user who made that posting.

In other words, by the user U simply doing a very natural and easy action of posting a specific word to the SNS he is familiar with on an everyday basis, it is possible to have printing of an image that expresses the content data linked to the specific word done on the user's own printer 30 (the printer 30 registered to the printing system 70). This is an item that dramatically reduces the burden on the user compared to, as with the prior art, the action of the user operating the information terminal to access a specific site on the internet, selecting the desired contents within that site and printing, and furthermore, the action of installing a dedicated application software or plug-in for content printing. Also, since easy use (content printing) is expected for the user via this kind of SNS, it is anticipated that there will be an expansion of many more users to use the print service using the printing system 70. Also, since the content data is not downloaded to the information terminal 20 used by the user, all that is required is sending in the print data format that is encrypted to the printer 30 noted in the linking information, so it is possible to prevent unauthorized copying of content data.

The user is able to know the specific word linked to the content data by various paths.

Figure 7:
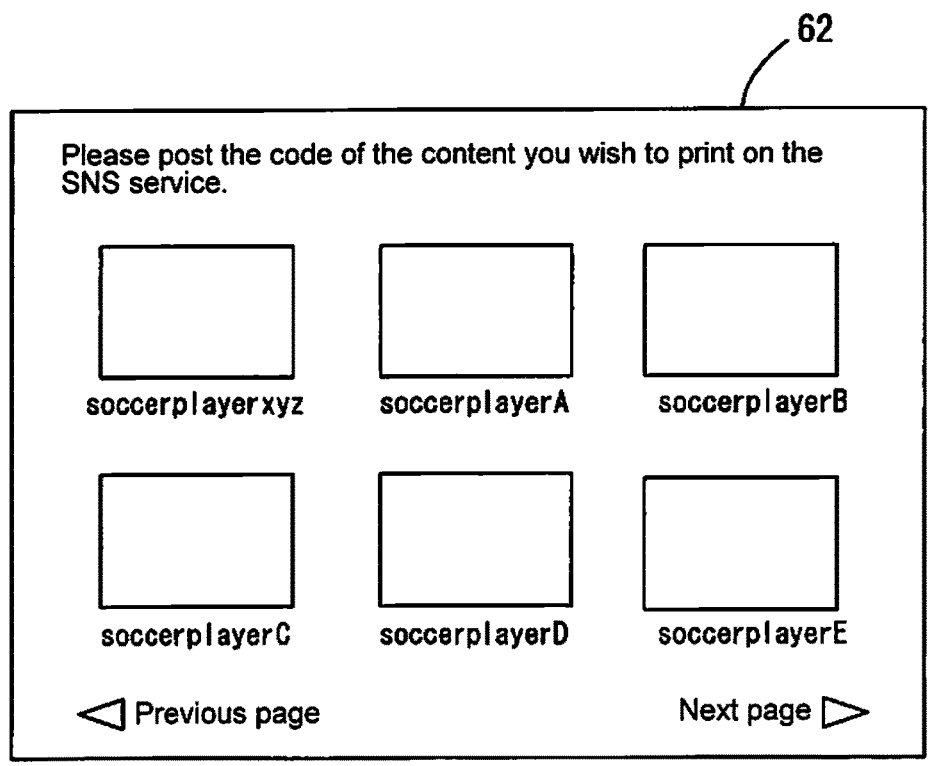
FIG. 7 is a drawing showing an example of a web page.

FIG. 7 shows an example of a web page 62 published on the internet IN by the printing system 70 (servers 50 and 60, or a web server included in a separate printing system 70 from servers 50 and 60). The user U is able to browse that web page 62 by accessing the web page 62 via various devices that can be connected to the internet IN (e.g. the information terminal 20). A plurality of sets of content data stored in the database 61 and codes (specific words) for uniquely identifying that content data are published on the web page 62. The user U can search for the content data he wishes to print by browsing this kind of web page 62, and can know the specific word corresponding to that content data he wishes to print.

Also, in a case when another user connected on the SNS with a certain user (e.g. a followee/follower relationship, friend relationship or the like) is already using the mechanism shown in FIG. 6, when printing content data linked to a certain specific word on a printer held by that other user, the concerned user U that browsed the posting of that other user is able to know that specific word. Alternatively, the printing system 70 that holds the content data can also introduce the specific word of various content data to many users with a profile page or the like of the account held on the SNS by the printing system 70. Alternatively, by the printing system 70 posting the specific word on the SNS, users connected to the printing system 70 on the SNS (e.g. a followee/follower relationship, friend relationship or the like) are able to know that specific word. In addition, each user of the SNS can recognize the specific word which the printing system 70 (administrator of the printing system 70) makes known to the world through various kinds of media (magazines, television and radio broadcasts and the like).

4. Modification Examples

The present invention is not limited to the embodiments described above, and it is possible to implement various modes within a scope that does not stray from the gist. For example, modification examples such as the following are also possible. Suitably combined contents of the embodiments described above and each of the modification examples noted hereafter are also included within the disclosed scope of the present invention.

Modification Example 1

Among the postings received by the SNS server 40, performing the determination of step S430 for all the postings including the specific word as the subject, and acquiring the content data (step S440) is a big burden for the server 50. Also, there are cases when a user who does not intend to print the content data happens to note by chance the same character string as the specific word in the posting. On the other hand, if the specific word is included in the posting that specifies as the destination the account on the SNS of the server 50, the user who made that posting can be thought to have quite a high probability of intending to print the content data using the print service. In light of that, the server 50 can also perform the determination of step S430 with only postings including the specific word, which are postings that specify as the destination the account on the SNS of the server 50 managing the print service (printing system 70) (@printservice) as the subject.

In specific terms, the server 50 uses the API provided by the SNS server 40 and monitors the existence of postings including the specific word that are postings with the account on the SNS of the server 50 (@printservice) as the destination (step S400). Then, a request for posting data relating to postings detected as items matching the conditions from this kind of monitoring result is sent to the SNS server 40 (step S410). With this kind of constitution, in relation to postings from a user for which there is a high possibility of intending to print content data using the print service, it is possible to acquire content data after determining the presence or absence of the link, so there is a significant reduction in the processing burden of the server 50, and it is also possible to shorten the overall time required until printing is completed. With this kind of modification example 1, the content data acquisition unit 74 can be said to acquire content data specified by that specific word having as a subject only postings including the specific word that are postings for which the account on the SNS of the server 50 is specified as the destination.

Modification Example 2

When together with the specific word, specific information indicating the printing conditions (printing condition information) is included in a posting to the SNS by the user U, the server 50 (printing instruction unit 76) can also have printing executed according to the printing conditions indicated by that printing condition information. Said another way, the user U can also include the printing condition information in the text posted to the SNS. Printing condition information is a specific character string indicating, for example, the number of copies to print, the paper size, the printing orientation, selection of color or monochromatic and the like. For example, the character string #3 indicates that the number of copies to print is 3, and the character string #postcard indicates that the paper is a postcard. Therefore, by the user performing the posting of "@printservice I want to print this #soccerplayerxyz#3#postcard", this gives instructions to print 3 copies of a photo of the soccer athlete linked to #soccerplayerxyz on postcards. The server 50 extracts printing condition information included in the posting from the posting data acquired at step S420, and generates print data according to the printing conditions indicated by the printing condition information at step S450 (e.g. generates print data of the pixel count according to the paper size specified by the printing condition information). Also, at step S460, the server 50 instructs the printer 30 with the printing conditions indicated by this kind of printing condition information, and has printing according to those printing conditions executed. With modification example 2, the user U is able to easily and reliably perform condition setting relating to printing of content data through the posting to the SNS.

Modification Example 3

The server 50 (print data generating unit 75) can also generate print data that synthesizes the image indicated by the content data acquired at step S440 and the characters or image included in the posting including the specific word linked to that content data (step S450). In other words, the server 50 superimposes characters or images included in the posting on the image indicated by the content data, and generates print data for printing contents expressed after this kind of superimposing. Characters that are subject to this kind of synthesis are sentences (a portion of) with the specific word in the posting removed, and applicable examples include messages by the user U such as for example "Good morning!," "Happy New Year," "Merry Christmas!," or the like. So that the server 50 side is able to judge which range of the characters within the posting are the characters to be subject to synthesis, there is a specific predetermined display inside the posting.

Also, the image included in the posting is an image attached with the posting including the specific word by the user U. This kind of attached image is uploaded together with the posting to the SNS server 40, and the SNS server 40 holds that attached image in a designated database for storing uploaded attached images. A URL indicating the saving destination of this kind of attached image is described in the meta data as part of the acquired posting data at step S420. In light of that, the server 50 accesses the URL of the attached image described in the meta data, and downloads the saved attached image. Then, print data is generated with superimposing of the attached image downloaded in this way and the image indicating the content data. With this kind of constitution, for example, if it is a template such as for the content data to embellish a photograph or the like, it is possible for the user U to easily obtain printing results for which the image uploaded to the SNS is synthesized with the template (e.g. New Year's card or Christmas card template).

Modification Example 4

The server 50 (print data generating unit 75) can also generate print data for which the image indicated by the content data acquired at step S440 is synthesized with at least a portion of the information of the meta data accompanying the posting including the specific word linked to that content data (step S450). At least a portion of the information of the meta data is for example attribute information relating to the posting such as the user name, and the posting date and time. Also, the meta data may include a URL indicating the saving destination of the profile photograph of the user U. The server 50 is able to access the URL of the profile photograph described in the meta data, and download the saved profile photograph. With this constitution, it is possible to easily obtain printing results for which the user name, posting date and time, user U profile photograph and the like of the user U who posted to the SNS is synthesized with the image indicated by the content data.

Modification Example 5

The server 50 can also be equipped with the notification processing unit 77 that notifies the progress status of the process relating to printing of the content data using a designated communication function to the user U (the information terminal 20 operated by the user U) who posted to the SNS provided by the SNS server 40. What is called a communication function here can possibly be a function of executing a posting to the SNS through the internet, for example, but it can also be communication using another method (e.g. an e-mail sending function). The progress status can be something to the effect of a determination that a printer linked to the SNS registration information exists (to the effect that a request for printing content data based on the posting of the specific word has been received), or conversely to the effect of a determination that a printer linked to the SNS registration information does not exist (to the effect that a request for printing content data based on the posting of the specific word has not been received), to the effect that an error occurred with print data generation or sending, or to the effect that sending of the print data to the printer has is completed.

As an example, the server 50 (notification processing unit 77), after it has acquired posting data at step S420, posts the progress status at various timings to the SNS provided by the SNS server 40. At this time, the server 50 gives instructions for the account of the SNS (@example (see FIG. 5B)) of the user U (the user U who did the posting corresponding to the posting data acquired at step S420), and performs posting of the progress status. The SNS server 40 receives this kind of posting (step S320 of FIG. 6). Also, by the user U operating the information terminal 20, he can browse the posting from this kind of server 50 (step S210 of FIG. 6). With this constitution, the user U who did the posting including the specific word is able to know the progress status of the process relating to printing of the content data due to that posting via the information terminal 20.

Modification Example 6

The server 50 can also be equipped with the sample image posting unit 78 for posting sample images of content data identified by the specific word included in the postings for which the SNS account of the user U who posted to the SNS provided by the SNS server 40 is specified as the destination. The sample image can be a thumbnail of the image expressed by the content data, or can be an image for which characters (e.g. "sample") indicating that it is a sample is superimposed. The server 50, for example at timing after the content data is acquired at step S440, posts the sample image to the SNS provided by the SNS server 40. The SNS server 40 receives this kind of posting (step S320 of FIG. 6). Also, by operating the information terminal 20, the user U is able to browse the sample image posted to the user's own account destination from the server 50 (step S210 of FIG. 6). With this constitution, the user U who made a posting including the specific word is able to confirm the format of the sample image for the contents of the content data linked to that specific word. Also, the server 50 does not post the content data itself as is, so it is also suitable from the perspective of content data protection.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing server, comprising:
   a linking information holding unit configured to hold linking information which links a user registration information relating to user registered in a social networking service and a printer;
   an identification information acquisition unit configured to acquire identification information from the social networking service to which a posting including the identification information for identifying content data that expresses an image has been performed;
   a content data acquisition unit configured to acquire content data specified by the acquired identification information;
   a printing instruction unit configured to cause the printer to print the acquired content data, the printer being linked to a registration information of a user that has performed the posting; and
   a sample image posting unit configured to specify as a destination an account on the social networking service of the user who has performed the posting, and post a sample image of the content data identified by the identification information included in the posting.

* * * * *